United States Patent Office 2,695,840
Patented Nov. 30, 1954

2,695,840

METHODS AND COMPOSITIONS FOR KILLING WEEDS

Paul W. Leppla, Palos Verdes, Calif., assignor to Great Lakes Carbon Corporation, New York, N. Y., a corporation of Delaware No Drawing. Application November 21, 1951,
Serial No. 257,670

17 Claims. (Cl. 71—2.6)

This invention relates to methods of killing weeds in an active state of growth and to novel compositions useful in such methods.

Various types of weed killers have been proposed and are currently in use. These materials are characterized by their ability to attack or exterminate certain undesirable species of vegetation, their action being selective in that desirable species are left substantially unaffected and in a more or less healthy or vigorous state. The weed killing agents which have been used include both organic and inorganic chemicals or compositions, some of the more common materials being described in U. S. Patents 2,220,505, 2,129,598–601, 2,284,002, 2,297,904 and 2,322,761. Examples of inorganic weed killing agents which have previously been employed include ammonium sulfonate, sodium chlorate, alkali metal bromates and iodates, alkali metal bisulphites, alkali metal chlorides, etc.

One method of applying herbicidal agents of the type described above involves dissolving the agent in an appropriate solvent, such as water, kerosene, fuel oil, etc. and applying the resulting solution, usually in the form of a spray, to the area desired to be treated. Alternatively, the herbicidal agent may be dry mixed with a pulverulent diluent such as talc, finely divided diatomaceous earth, ground pumice, fuller's earth, whiting, etc., and applying the resulting active dusts to the areas to be treated. While these methods are suitable for application at close range and where there is no danger of contamination of adjacent areas in which certain vegetation might be damaged, there has always been a distinct hazard in that particles of active spray or dust may be carried over on to adjacent areas under cultivation with harmful effects due either to the method of application or to the fact that the particles of active agent are miscarried by wind or air currents. Progress in the application of herbicidal agents by aircraft has been retarded because of the difficulties just mentioned. Attempts have been made to solve this problem by incorporating the herbicidal agents into or upon pellets consisting essentially of fuller's earth, natural clays, or other pelletized powders. While such pellets lend themselves to controlled distribution by aircraft over a designated area, they leave much to be desired in that the bonding agents employed during the pelletizing operation are usually water soluble. The pellets are therefore adversely affected by rainfall or conditions of high humidity which cause slacking and progressive disintegration of the pellets. During periods of reduced humidity or drought, the resulting disintegrating pellets form dusts which may be picked up by prevailing winds thereby causing damage to adjacent areas where the presence of such agents would be undesirable. Furthermore, the disintegration of such pellets accelerates the release of the herbicidal agents and the effective life or period of activity of the pelleted compositions is thereby substantially reduced. In addition to the foregoing the cost of pelletizing fine powders is relatively expensive and in many cases economically prohibitive. The cost of the final herbicidal compositions is from two to three times that of the novel compositions described and claimed herein.

It is an object of this invention to provide novel effective herbicidal agents having improved properties with respect to length of active service, resistance to abrasion, and disintegration due to climatic conditions.

It is a further object of the invention to provide novel methods for the application of herbicidal agents wherein the amount and extent of application of such agents is subject to close control by the applicator.

The above objects as well as others which will become apparent upon understanding of the invention as described herein are achieved by exposing (or applying to) the foliage of weeds in a defined agricultural area to a composition comprising essentially a substantially dry pumice aggregate of defined properties, which aggregate is impregnated with herbicidal agent in a manner subsequently described herein. I have found that the novel compositions described and claimed herein can be applied to large agricultural areas by aircraft as well as by more conventional means while maintaining close control over said application with respect to the area being treated and the concentration of herbicidal agent being applied to each unit area.

Pumice is a porous, frothy, glassy material having a wide variation in apparent bulk density, water absorption and compressive strength. Pumice has been laid down by the action of volcanoes long extinct and results from sudden expansion of gases within lava rock, the latter consisting essentially of aluminum silicates. Upon rapid cooling of the hot expanded lava rock, tiny bubbles of gas are trapped in the particles with the result that the final cooled material has a sponge-like appearance. I have found that for the purpose of a base for the herbicidal agents described herein it is essential that the pumice aggregate have a particle size range falling within $-\frac{1}{4}''$ to $+50$ mesh (U. S. Series Screen) and that the aggregate have a water absorption factor, on a dry basis, of at least 25 per cent by weight, preferably 30 to 150 per cent, the higher factor being characteristic of the larger particles in the aforementioned range. I have found that for the purpose of the present invention pumice aggregate in the aforementioned particle size range and water absorption factors has developed, presumably by nature, a resistance to abrasion and crushing which properties cannot be met by pumice aggregate falling outside of the aforementioned particle size range and absorption factors. This particular pumice aggregate is further characterized by its resistance to slacking and disintegration when wet by water, which property is essential to the herbicidal compositions presently under consideration. Its resistance to abrasion is also highly important to prevent dusting or the formation of fine particles in the final herbicidal agent during handling and application to agricultural areas.

I have further found that pumice falling within the above mentioned particle size range and having a water absorption factor of at least 25 per cent by weight affords an aggregate which may be substantially uniformly impregnated with solutions of herbicidal agents.

In addition to the above mentioned properties of pumice aggregate which are essential in the preparation of my novel herbicidal compositions, I have found that control of the apparent bulk density of the pumice aggregate is important and that preferably the apparent bulk density will be between 30 to 40 lbs. per cu. ft. for an aggregate which will pass a 10 mesh screen and will be retained on a 30 mesh screen, which size distribution I have found to be particularly effective for aircraft application.

The novel herbicidal compositions described herein may be applied to fields where the desired and undesirable vegetation are in a relatively advanced state of growth. Alternatively, and in some cases a preferred procedure, application is made on a cultivated, newly seeded area so that as the weeds emerge from the soil they are brought under control directly while the desired plants grow normally.

Numerous herbicidal agents and mixtures thereof may be incorporated into the pumice aggregate, the nature of the agent selected being governed by the type of weed which is to be controlled. Of most general effectiveness are the arylcarboxylic acid compounds of the type mentioned in the above enumerated patents. Included in the term "compounds" are the free acids and their esters and salts. Compounds which have been found to be effective include the phenyl, naphthyl, anthracene and tetra-aryl mono-carboxylic acid, their esters and salts. The aryl portions of the compounds may contain substituents such as halogen, hydroxyl, nitro or alkyl or alkoxy groups such as methyl, ethyl, propyl, butyl, naphoxy and ethoxy. Also included among the herbicidal agents contemplated herein are aryl substituted aliphatic acids having 1–9 carbon atoms; for example, aryl substituted propionic, acetic, butyric and acrylic acids.

The term "esters" is broad enough to cover the esters corresponding to both the saturated and unsaturated alcohols. As examples of suitable esters may be mentioned the alkyl and alkylene esters such as methyl, ethyl, propyl, butyl, amyl, octyl, lauryl, oleyl, allyl, and isoprene esters, the esters of polyhydroxy alcohols such as the esters of ethylene glycol and of the polyethylene glycols, and the aralkyl esters such as the benzyl esters.

The polyethylene glycol ester of a desired acid may be made by heating a polyethylene glycol, such as carbowax of molecular weight of 600 or over, with the arylcarboxylic acid in the presence of a catalyst such as sulphuric acid.

The term "salts" is broad enough to include the alkali and alkaline earth salts such as sodium, potassium, lithium, ammonium, magnesium, calcium, the acid salts such as the sodium and potassium acid salts, the salts of other metals such as copper and iron, and the substituted organic ammonium salts such as the salts of methylamine, trimethylamine, diethylamine, monoethanolamine, triethanolamine and isopropanol amine.

The following is a representative list of compounds which have been found to be suitable for the purposes of this invention:

Benzoic acid, its halogen and nitro substitution products such as 2,4-dichloro-benzoic acid, 2,5-dichloro-benzoic acid, 3,5-dichloro-benzoic acid, 2,3,5-triiodobenzoic acid, 2-chloro-5-nitrobenzoic acid and 2-bromo-3-nitro-benzoic acid, and the esters and salts of said acids.

Phenyl acetic acid, its halogen substitution products such as 2-chloro-phenyl acetic acid, 4-chloro-phenyl acetic acid, 4-bromo-phenyl acetic acid, and 4-iodo-phenyl acetic acid, and the esters and salts of said acids.

Phenyl-alpha and gamma butyric acid, and their various derivatives, particularly 4-chlorophenyl-alpha and gamma butyric acids, and the esters and salts of said acids.

Naphthalene-1-acetic acid, its alkyl substitution products such as 2-methyl-naphthyl-1-acetic acid and 1-methyl-naphthyl-1-acetic acid, the halogen substitution products such as 4-chloro-naphthyl-1-acetic acid, the nitro-substitution derivatives such as 4-nitro-naphthyl-1-acetic acid and the esters and salts of said acids are suitable.

1-naphthalene-alpha-propionic acid, 1-naphthalene beta-propionic acid, 1-naphthalene gamma-butyric acid, their halogen substitution products, 1-naphthoic acid, 2-naphthoic acid, the halogen substitution products, tetralyl-6-acetic acid, anthracylacetic acid, its halogen substitution products, and the esters and salts of the foregoing compounds.

I also contemplate the use of inorganic herbicidal agents including ammonium sulfamate, sodium bisulphite, sodium chlorate alkali metal bromates and iodates, etc.

In the case of water soluble herbicidal agents, these may be dissolved in an appropriate amount of water and the resulting solution added to the pumice aggregate. The amount of water or other solvent preferably employed is that which is sufficient to completely wet or satisfy the absorptive capacity of the previously dried pumice aggregate. This results in a substantially uniform impregnation of the aggregate with herbicidal agent. The resulting composition is then dried at a temperature below the decomposition point of the agent and at such a rate as to prevent or minimize migration of the agent to the surface of the aggregate. This results in a herbicidal composition wherein the agent is substantially uniformly distributed throughout the aggregate and which is substantially free from particles of the agent adhering loosely to the outside surfaces of the aggregate and which could be easily removed by abrasion or by the action of aggregate particles moving against each other.

It is also within the contemplation of my invention to employ certain wetting, dispersing or emulsifying agents in the solution employed for impregnating the particles of pumice. This is particularly helpful where the herbicidal agent has a low solubility in water. I may employ commercially available detergents, water dispersion and emulsifying agents of the type listed in Mattiello ("Protective and Decorative Coatings," vol. IV, John Wiley and Sons, New York, 1944). These agents may include the non-ionic type which are not affected by salts, acids or bases.

Sulfonated vegetable oils (e. g. sulfonated castor oil, corn oil, peanut oil, soy bean oil, etc.) are examples of ionic agents that I may use. These have certain cost advantage, but being ionic, they have their limitations when used in the presence of acids, bases and salts. When such agents are used, it is advisable to use distilled or soft water for dilution purposes.

Agents of the non-ionic type are preferred. This type of agent will usually dissolve or suspend from 1 to 50% by its volume or weight of the herbicide and the mixture can then be diluted with water to the desired concentration for application to the aggregate. The usual amounts of salts, acids or alkalis apparently have little, if any, effect on the resulting solution or suspension.

A class of non-ionic agents that I have found particularly suitable for the purposes of this invention may be defined as follows:

A water-soluble, non-ionic emulsifying agent containing polyether groups of the formula $R.O(C_2H_4O)n.R_1$, where R is an alkyl, aryl, aralkyl, alkyl-aryl or acyl group of 10 carbon atoms or more, and $R_1$ is an alkyl, aryl, aralkyl, alkyl-aryl, or acyl group or a hydrogen atom, and $n$ is an integer greater than 2 and generally greater than 10.

The amount of herbicidal agent contained in the impregnated pumice aggregate may vary considerably but is usually between 0.1 to 20% by weight of the aggregate (dry basis). The amount of agent will depend upon numerous factors including the vapor pressure and water solubility of the agent, and the duration of desired effectiveness in the area where the composition is placed for weed control.

I have found that the impregnation of pumice aggregate having the aforementioned properties with solution of herbicidal agents, followed by drying to remove the impregnating vehicle, in no way affects the properties of the aggregate regarding strength, abrasion resistance to slacking.

In a preferred embodiment of the invention, a pumice aggregate whose particles fall within the range of −¼" to +50 mesh (U. S. Series Screen) and having an average water absorption factor (on a dry basis) of about 50% by weight and an apparent bulk density of about 35 lbs. per cu. ft., was dried to remove substantially all of the absorbed water which is found to be naturally occurring in the pumic deposits. The dried pumice aggregate was mixed with an aqueous solution of the sodium salt of 2,4-dichlorophenoxy acetic acid in the following proportions:

| | | |
|---|---|---|
| Water | gal. | 20 |
| Herbicidal agent | lbs. | 10½ |
| Dried pumice aggregate | lbs. | 200 |

The resulting composition was dried at a temperature not in excess of 300° F. until the resulting composition had moisture content less than 2% by weight. The final product was found to contain 99+% of material which was retained on a 30 mesh screen. This composition was applied by an aeroplane to a weed-containing area, the plane being flown at a height of 25–50 ft., the applicator being set so as to lay down between 1–3 particles of the herbicidal composition per sq. in. of ground. It was found that due to the particle size, abrasion and crushing resistance, close control could be obtained in restricting the application of the agent to a previously designated area and that the distance traveled by the particles due to prevailing winds could be closely calculated.

The area treated as described above was kept effectively under control for at least three weeks, and it was found that the particles did not disintegrate due to the action of rainfall or conditions of high humidity. Presumably, the long period of effectiveness of the agent is due to a slow release of the herbicidal agent from the aggregate due to leaching by water vapor or rainfall. No incidence of dust formation was observed and it was therefore possible to insure protection to adjacent areas where presence of the feed killing composition would have proven to be harmful.

In a further embodiment of the invention, a 30 per cent solution of sodium 2,4-dichlorophenoxyethyl sulfate was applied to a pumice aggregate having a particle size substantially within the range of −10 to +30 mesh and having an apparent bulk density of 35 lbs. per cu. ft. and an average water absorption factor of about 60 per cent by weight. The solution was applied to the pumice aggregate in an amount so as to leave a 10 per cent residue of the herbicide (dry basis) on the aggregate. The resulting composition was dried at 250° F. to a moisture content of less than 2 per cent by weight. The resulting product was applied by aircraft to a cultivated seeded area for "pre-emergence" weed control. This treatment was effective for a period of three to four weeks, during which time the desired plants emerged from the soil and grew normally.

In order to further illustrate the invention with no intention of being limited thereby, the following compositions are set forth as exemplary. A previously dried pumice aggregate having a particle size of −10 to +30 mesh and having a water absorption factor (on a dry basis) of about 40 to 50 per cent by weight and an apparent bulk density of about 33 lbs. per cu. ft. was employed as the base material. The herbicidal agent was dissolved in the designated solvent, the latter being employed in quantity sufficient to satisfy the absorptive capacity of the aggregate. The resulting impregnant compositions were dried at temperatures of 250–300° F. to produce a final herbicidal agent which was substantially free from solvent.

Table I exemplifies compositions wherein the agent is soluble in water, the lower aliphatic alcohols or mixtures thereof.

Table I

| Example No. | Herbicide | Percent Herbicide by Wt. of Dry Aggregate | Solvent |
|---|---|---|---|
| 1 | 2,4-dichlorophenoxy acetic acid (2,4-D). | 1.0 | 50:50 mixture by volume of water and denatured alcohol. |
| 2 | do | 5.0 | Do. |
| 3 | 2,4-D sodium salt | 5.0 | Water. |
| 4 | do | 10.0 | Do. |
| 5 | 2,5-dichloro-phenoxy acetic acid (2,5-D). | 5.0 | Denatured alcohol. |
| 6 | 2,5-D ammonium salt | 10.0 | Water. |
| 7 | 2,4-D morpholine salt | 5.0 | Do. |
| 8 | 2,4-D ethanolamine | 3.0 | Do. |
| 9 | 2,4,5-trichlorophenoxy acetic acid. | 5.0 | Denatured alcohol. |
| 10 | 2,4,5-trichlorophenoxy acetic acid sodium salt. | 10.0 | Water. |
| 11 | 2,4-dichlorophenoxy acetic acid mercury salt. | 5.0 | Ethyl alcohol. |
| 12 | Pentachloropenol-sodium salt. | 5.0 | Water. |
| 13 | 4,6-dinitro-cresylic acid-ammonium and sodium salt. | 2.0 | Do. |
| 14 | Alpha-naphthoxyacetic acid-sodium salt. | 0.5 | Do. |
| 15 | Ammonium trichloroacetate. | 10.0 | Do. |
| 16 | Gamma-phenoxy-butyric acid. | 5.0 | Acetone. |
| 17 | Potassium phenyl acetate. | 3.0 | Water. |

Table II exemplifies composition wherein the herbicidal agent is oil soluble. The final compositions are highly effective for the purpose intended and in some cases the period of activity exceeds that of the activity of the compositions impregnated with the water soluble agents:

Table II

| Example No. | Herbicide | Percent Herbicide by Wt. of Dry Aggregate | Solvent |
|---|---|---|---|
| 18 | 2,4-dichloro-nitro benzene | 10.0 | Kerosene. |
| 19 | Furfural | 5.0 | Do. |
| 20 | Ethyl N-phenyl-carbonate | 2.0 | Xylene. |
| 21 | Isopropyl carbonilate | 1.0 | Acetone. |
| 22 | 3,5-dinitro-o-cresol | 15.0 | Kerosene. |
| 23 | Hexachloro-cyclohexane | 7.0 | Toluene. |
| 24 | Methoxone | 3.0 | Methyl ethyl ketone. |
| 25 | Tetrachloroethane | 5.0 | Toluene. |
| 26 | Chloropicrin | 0.5 | Acetone. |
| 27 | 2,4-dinitro-6-sec-butyl-phenol | 2.0 | Do. |
| 28 | 1,2,4-dithiazole | 1.0 | Do. |
| 29 | o-dichlorobenzene | 2.0 | Xylene. |

Table III exemplifies a composition wherein the herbicidal agent is mixed with a wetting agent, the resulting composition being added to water as a solvent. This dispersion or emulsion is then added to the pumice aggregate, the remaining procedural steps being the same as outlined above.

Table III

| Example No. | Herbicide | Wetting Agent | Percent Herbicide by Wt. of Dry Aggregate | Percent Wetting Agent by Weight of Herbicide |
|---|---|---|---|---|
| 30 | Phenyl acetic acid. | Polyalkylene ether alcohol. | 5.0 | 20.0 |
| 31 | Naphthyl-1-acetic acid. | Sulfonated castor oil. | 5.0 | 10.0 |
| 32 | 2,4-D | Sodium lauryl sulfate. | 7.0 | 10.0 |
| 33 | Methyl phenylacetate. | Polyethylene glycol (carbowax 400B). | 10.0 | 15.0 |

Table IV exemplifies compositions in which the herbicidal agent is inorganic in nature. While such compositions are effective in controlling certain weeds, agriculturists have determined that in general the organic agents, of the type set forth in Tables I–III, are less harmful to the soil and are more widely or more generally applicable.

Table IV

| Example No. | Herbicide | Percent Herbicide by Wt. of Dry Aggregate | Solvent |
|---|---|---|---|
| 34 | Ammonium sulfamate | 10 | Water. |
| 35 | Sodium bisulfite | 10 | Do. |
| 36 | Sodium chlorate | 8 | Do. |

While the compositions described herein are particularly and admirably adapted to treatment of agricultural areas by means of aircraft, it is to be understood that more conventional methods of application may be employed such as by applying the compositions either by hand or mechanically in close proximity to the vegetation sought to be controlled. In addition, the invention is not limited to the specific compositions set forth herein or to the specific methods disclosed for preparing my novel compositions.

I claim:

1. A composition for killing growing weeds comprising essentially a substantially dry pumice aggregate impregnated with herbicidal agent, said aggregate having a particle size within the range of −¼ inch to +50 mesh and a water absorption factor, dry basis, of at least 25 per cent by weight, said aggregate being resistant to abrasion, crushing, and to slacking when wet by water.

2. A composition according to claim 1 wherein the herbicidal agent is an arylcarboxylic acid compound.

3. A composition according to claim 1 wherein the herbicidal agent is material of the group consisting of 2,4- and 2,5-dichlorophenoxy acetic acids, their salts and esters, and mixtures thereof.

4. A composition according to claim 1 wherein the herbicidal agent is sodium 2,4-dichlorophenoxyethyl sulfate.

5. A composition for killing growing weeds comprising essentially a substantially dry pumice aggregate having a particle size from about −10 mesh to about +30 mesh, said aggregate being resistant to abrasion, crushing and to slacking when wet by water and having a water absorption factor, dry basis, of between 100 to 30 per cent by weight and an apparent bulk density of between 30 to 40 lbs. per cu. ft. said aggregate being impregnated with from 0.1 to 20 per cent by weight of 2,4-dichlorophenoxy acetic acid.

6. A composition for killing growing weeds comprising essentially a substantially dry pumice aggregate having a particle size from about −10 mesh to about +30 mesh, said particles being resistant to abrasion, crushing and to slacking when wet by water and having a water absorption factor, dry basis, of between 100 to 30 per cent by weight, said aggregate being impregnated with from 0.1 to 20 per cent by weight of the sodium salt of 2,4-dichlorophenoxy acetic acid.

7. A composition for killing growing weeds comprising essentially a substantially dry pumice aggregate having a particle size from —10 mesh to about +30 mesh, said particles being resistant to abrasion, crushing and to slacking when wet by water and having a water absorption factor, dry basis, of between 100 to 30 per cent by weight, said aggregate being impregnated with from 0.1 to 20 per cent by weight of sodium 2,4-dichlorophenoxyethyl sulfate.

8. The method of killing weeds in an active state of growth which comprises applying to a weed containing area a composition comprising essentially a substantially dry pumice aggregate impregnated with herbicidal agent, said aggregate having a particle size within the range of —¼ inch to +50 mesh and a water absorption factor, dry basis, of at least 25 per cent by weight, said aggregate being resistant to abrasion, crushing and to slacking when wet by water.

9. The method of claim 8 wherein the herbicidal agent is sodium 2,4-dichlorophenoxyethyl sulfate.

10. The method of claim 8 wherein the herbicidal agent is material of the group consisting of 2,4- and 2,5-dichlorophenoxy acetic acids, their salts and esters, and mixtures thereof.

11. The method of killing weeds in an active state of growth which comprises applying to a weed containing area a composition comprising essentially a substantially dry pumice aggregate having a particle size from about —10 mesh to about +30 mesh, said aggregate being resistant to abrasion, crushing, and to slacking when wet by water and having a water absorption factor, dry basis, of between 100 to 30 per cent by weight and an apparent bulk density of between 30 to 40 lbs. per cu. ft., said aggregate being impregnated with from 0.1 to 20 per cent by weight of the sodium salt of 2,4-dichlorophenoxy acetic acid.

12. The method of killing weeds in an active state of growth which comprises applying to a weed containing area a composition comprising essentially a substantially dry pumice aggregate having a particle size from about —10 mesh to about +30 mesh, said aggregate being resistant to abrasion, crushing, and to slacking when wet by water and having a water absorption factor, dry basis, of between 100 to 30 per cent by weight, said aggregate being impregnated with from 0.1 to 20 per cent by weight of the sodium salt of 2,4-dichlorophenoxy acetic acid.

13. The method of controlling weed growth in a cultivated, seeded agricultural area which comprises applying to said area prior to appearance of active vegetated growth a herbicidal composition comprising essentially a substantially dry pumice aggregate impregnated with herbicidal agent, said aggregate having a particle size within the range of —¼ inch to +50 mesh and a water absorption factor, dry basis, of at least 25 per cent by weight, said aggregate being resistant to abrasion, crushing, and to slacking when wet by water.

14. The method of claim 13 wherein the herbicidal agent is sodium 2,4-dichlorophenoxyethyl sulfate.

15. The method of controlling weed growth in a cultivated, seeded agricultural area which comprises applying to said area prior to the appearance of active vegetated growth a herbicidal composition comprising essentially a substantially dry pumice aggregate having a particle size from about —10 mesh to about +30 mesh, said particles being resistant to abrasion, crushing and to slacking when wet by water and having a water absorption factor, dry basis, of between 100 to 30 per cent by weight, said aggregate being impregnated with from 0.1 to 20 per cent by weight of the sodium salt of 2,4-dichlorophenoxy acetic acid.

16. The method of killing weeds in an active state of growth which comprises applying to a weed containing area a composition comprising essentially a substantially dry pumice aggregate having a particle size from about —10 mesh to about +30 mesh, said aggregate being resistant to abrasion, crushing, and to slacking when wet by water and having a water absorption factor, dry basis, of between 100 to 30 per cent by weight and an apparent bulk density of between 30 to 40 lbs. per cu. ft., said aggregate being impregnated with from 0.1 to 20 per cent by weight of sodium 2,4-dichlorophenoxyethyl sulfate.

17. The method of controlling weed growth in a cultivated, seeded agricultural area which comprises applying to said area prior to the appearance of active vegetated growth a herbicidal composition comprising essentially a substantially dry pumice aggregate having a particle size from about —10 mesh to about +30 mesh, said particles being resistant to abrasion, crushing and to slacking when wet by water and having a water absorption factor, dry basis, of between 100 to 30 per cent by weight, said aggregate being impregnated with from 0.1 to 20 per cent by weight of sodium 2,4-dichlorophenoxyethyl sulfate.

References Cited in the file of this patent

UNITED STATES PATENTS

| Number | Name | Date |
|---|---|---|
| 2,523,228 | Mullison | Sept. 19, 1950 |
| 2,604,428 | Macy | July 22, 1952 |

OTHER REFERENCES

Science News Letter, Aug. 2, 1947, page 69.